United States Patent [19]
Duvent

[11] Patent Number: 4,724,482
[45] Date of Patent: Feb. 9, 1988

[54] INFRARED THERMOGRAPHY SYSTEM WITH SENSITIVITY IMPROVED BY PROGRESSIVE ACCUMULATION OF IMAGE LINES

[75] Inventor: Jean-Louis Duvent, Orsay, France

[73] Assignee: Telecommunications Radioelectriques, Paris, France

[21] Appl. No.: 700,940

[22] Filed: Oct. 19, 1984

[30] Foreign Application Priority Data

Oct. 21, 1983 [FR] France ................... 83 16781

[51] Int. Cl.⁴ .................. H04N 5/33; G02B 26/10
[52] U.S. Cl. ....................... 358/113; 250/334; 358/106; 358/213.28
[58] Field of Search ............... 358/113, 166, 167, 284, 358/206, 105, 213.22, 213.28; 382/54, 42; 250/330, 334, 338 PY, 338 R

[56] References Cited

U.S. PATENT DOCUMENTS

| | | | |
|---|---|---|---|
| 3,431,405 | 3/1969 | Dawson | 382/42 X |
| 3,723,642 | 3/1973 | Laakmann | 358/166 |
| 3,927,309 | 12/1975 | Fujiwara et al. | 382/54 X |
| 4,064,531 | 12/1977 | Koubek | 358/166 X |
| 4,262,199 | 4/1981 | Bridges et al. | 358/113 X |
| 4,315,284 | 2/1982 | Stillwell et al. | 358/113 X |
| 4,335,400 | 6/1982 | Chow et al. | 358/113 |
| 4,396,903 | 8/1983 | Habicht et al. | 382/42 X |
| 4,481,535 | 11/1984 | Hodd et al. | 358/113 |
| 4,506,292 | 3/1985 | Newton et al. | 358/166 X |
| 4,532,548 | 7/1985 | Zwirn | 382/42 X |

Primary Examiner—Stephen C. Buczinski
Assistant Examiner—Linda J. Wallace
Attorney, Agent, or Firm—Stevens, Davis, Miller & Mosher

[57] ABSTRACT

A thermography system comprising an infrared camera with line and raster scanners and at least one photosensitive detector, an electronic digital signal processor, and means for the visualization of the signal processed on the screen of a television monitor, a control unit can slow down raster scan in the camera by radio 1/n, and can, simultaneously, cause special signal processing. "n" signals are added with respect to each element in a field by an adder and stored in a storage. The signals are provided at the line scanning rate, and cause the sum for each element in a line to be entered in an image storage, the image of the field of view with the sensitivity improved by line accumulation is reconstructed on the screen of the television monitor by repetitive reading of the image storage.

11 Claims, 3 Drawing Figures

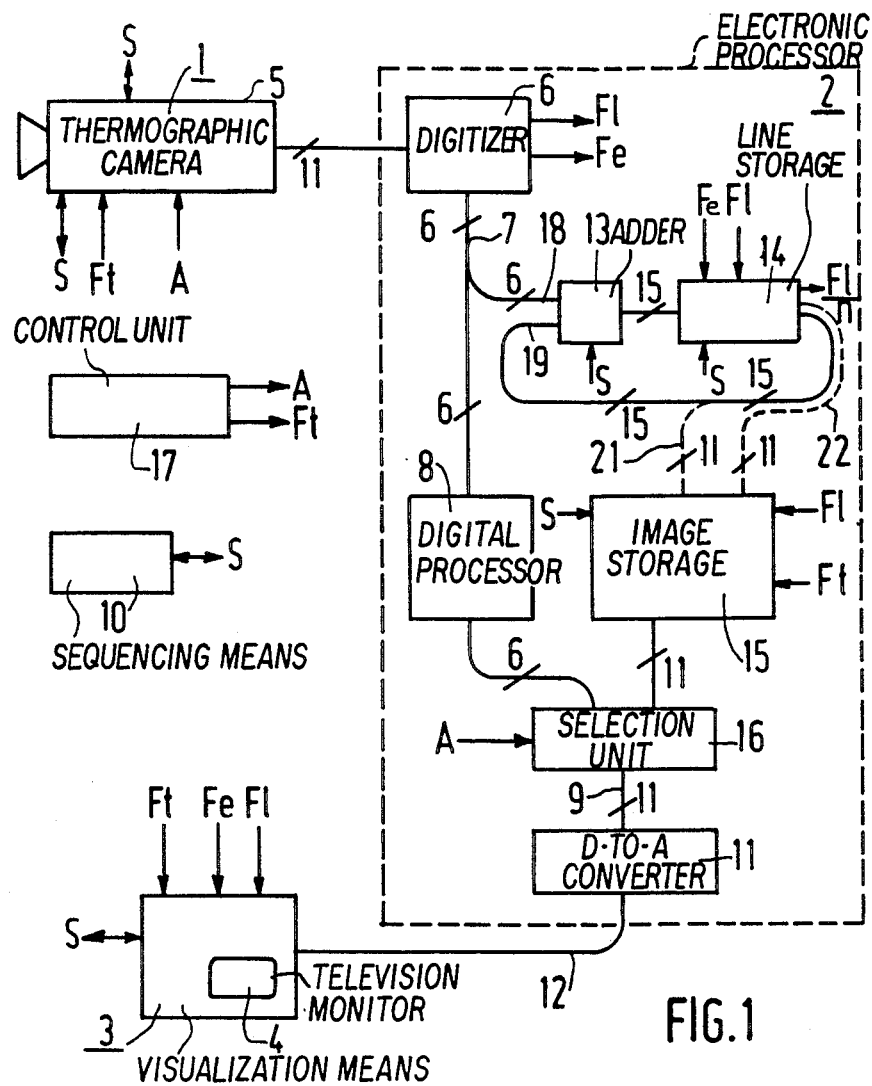
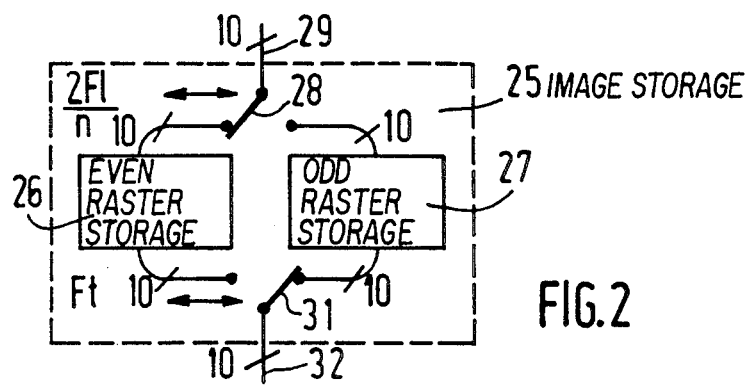

INFRARED THERMOGRAPHY SYSTEM WITH SENSITIVITY IMPROVED BY PROGRESSIVE ACCUMULATION OF IMAGE LINES

BACKGROUND OF THE INVENTION

1. Field of the Invention

The present invention relates generally to infrared thermographic systems and specifically to improved long-range viewing through such systems.

2. Discussion of the Prior Art

Imaging systems are used to visualize at least a portion of the landscape by means of infrared radiation in the frequency spectrum at a wavelength longer than one micron, which spectrum includes visible light. In the visible light range, known television cameras utilize electron beam scanning in a conventional manner. Visualization in the infrared range can be by day or night but is generally more useful at night when direct vision in the visible range is reduced or impossible. The spectral bands of the radiation detected by these thermographic systems correspond to atmospheric transparent windows, at wavelengths of either 3 to 5$\mu$ or 8 to 12$\mu$. The latter spectral band is particularly suited to thermographic systems because it is perfectly adapted to imaging bodies at ambient temperature, because a black body at 300° K. has its maximum emission at about 10$\mu$. Systems that employ optical/mechanical raster and line scanners are generally known, as discussed in La thermographie infrarouge [Infrared Thermography] by G. Gaussorgues Part 1, published by Technique et Documentation 11 rue Lavoisier, 75386 Paris Cedex 08, France on Dec. 2, 1980, herein incoporated by reference.

The sensitivity of present infrared cameras is inadequate for certain operations, such as sky, land or sea horizon surveillance, especially when atmospheric conditions are poor, or when long-range detection (on the order of several dozens of kilometers) is desired.

The conventional procedure for improving the sensitivity of infrared cameras is to sum successive images. It will be noted that the human eye itself performs this processing, accumulating at the most four to five successive images. If i is the number of images accumulated, the gain in the signal/noise ratio is $\sqrt{i}$. The eye thus provides a sensitivity gain on the order of 2. On the other hand, if the accumulation is made electrically by summing and averaging 16 successive images, for example, the eye no longer can be regarded as an integrator, for the image now is updated too slowly. So, the apparent gain for an observer, with respect to a normal functioning of $\sqrt{2}$, is 2 even when there is an accumulation of 16 images.

It will be noted that this image accumulation processing can be performed at the digital level by an electronic processor without in any way changing the functioning of the camera's raster and line scanners with respect to the normal functioning of the system. The major inconvenience of the above accumulation procedure is the need for a stable sight. However, even assuming that a stable sight is provided, a moving target in the field of view can become blurred, depending upon the amount and direction of movement. The duration of 16 images would be 0.64 second at 25 images (50 rasters) per second, which corresponds to the European television standard. Image stability could be improved tracking a reference, selected by the operator, or the target itself after detecting by the concatenation method and measurement after this detection. The blurring effect due to motion thus will be less, but at the expense of the recognition range because of the concatenation processing and the consequently long image updating time due to accumulation processing by images.

SUMMARY OF THE INVENTION

One object of the invention is to improve the sensitivity of the infrared thermography system.

Another object of the invention is to improve detection range and at the same time the recognition range of the infrared thermography system.

Still another object in the case of an infrared thermography system that analyzes several lines simultaneously with the aid of several detectors in the raster direction is to obtain a more homogeneous image on the television monitor.

The above and other objects are achieved in accordance with the present invention by progressive lineal or line accumulation which is the slowing down of the movement of the vertical or raster scanner with respect to known normal scanning modes, such that any two lines that follow each other in the time that the image of the field is projected on the infrared detectors overlap. The spatial difference between these two successive lines is small with respect to the dimension, in the raster direction, of a detector such that each element field of the field of view is analyzed n successive number of times at the line scanning rate for the aforesaid detector. This provides the corresponding n successive analog signals at the camera output. The n signals, with respect to each element are added, after being put in digital form, and stored in a predetermined cell in the image storage incoporated in the aforesaid electronic processor. The image of the field of view is restored on the aforesaid television monitor by repetitive reading of the aforesaid image storage.

For the same reason as for the prior art image accumulation, the line accumulation analysis mode in accordance with the present invention implies digitalization of the signal from the camera output, an adder, and sequential storage of the image as a whole. Moreover, the line accumulation mode necessitates a slowing down of the vertical scan, something that is not the case for image accumulation, as has been indicated above. If one pursues the comparison, one notes that line accumulation is a much more flexible mode, and that it almost completely resolves the probelms of sharpness and/or homogeneity of the image in the case of a sight that is not perfectly stable, or of a moving body in the camera field. This is true for gains in sensitivity due to the supposed equal number of accummulations in both accumulation analysis modes.

Continuing with the above example of the accumulation of 16 successive images, if it is assumed that the accumulation is lineal for raster scanning movement slowed down in a ratio of n=16, which represents the same accumulation capacity or the previously discussed image accumulator mode, it is clear that for a given point in the image on the screen of the television monitor (that corresponds to an elementary field of the field of view), the electron beam that generates this point results in a mean of 16 successive element signals at the output of a photosensitive detector at a frequency that is the image frequency. The result in the line accumulation mode is a mean of 16 element signals emitted at the line frequency (which of course is much higher than the image frequency). In the image accumulation mode, no point can be obtained before analysis of 16 successive images, after which all points of the sum image are obtained during an image duration. In the line accumulation mode, the lines of the sum image are obtained at a rate of 1/16 T1, where T1 is the overall line period where $T1 = 1/F1$ ($F1$ equal to the line scanning frequency). Therefore, the time difference between successive scans of the same line are much less than the time difference between successive image scans.

What follows is that the temporal correlation between two neighboring or adjacent points on a given line, or of two neighboring lines, is much better with line accumulation than with image accumulation. In line accumulation, the image of a slightly moving field, and/or moving body in the field, can be represented by progressive displacement between successive lines of the lines of the sum image, that is, an oblique appearance of targets seen, or compressions, or expansions, but the effect of blurring cannot be produced at the image level. This blurring effect could, theoretically, be produced at the line level, if it is assumed that the time required for the generation of each line of the sum image is comparable to the integration time for the eye, which here serves as the reference, or about 200 ms. What is obtained for an image of 625 lines, 510 lines of which are useful, made up of two interlaced rasters, and 25 images (50 rasters) per second, is a ratio of $n = 3125$, or a theoretical gain in sensitivity of $\sqrt{3125/2} = 28$, which is pointlessly high for the practical applications envisaged.

Thus, the only problem that remains is distortion of moving targets, in appearance or in fact, on the summed image, but the eye is perfectly capable of reconstructing the real shapes, much more so than when attempting to reestablish blurred outlines.

A first embodiment of the present invention utilizes an electronic processor comprising a signal processing chain, between the prior art digitizer and the prior art digital-to-analog converter, made up of a series cycler comprising the aforesaid adder and a line storage fitted with the sequencing means, and at least a raster storage comprising a portion of the known image storage, and fitted with a second portion of the sequencing means, such that the repetitive reading of the image storage is accomplished in parallel with respect to the recording of the image storage.

Just as is the case for certain image accumulation systems, it is possible, in the line accumulation system of the present invention, to obtain the mean of n signals assigned to each image point by using a repetitive or recursive filter that attenuates each signal at a very much weaker ratio, so that this signal is moved back in time, thus making it possible to reduce the capacity of the transfer storage upstream from the image storage as well as the number of bits assigned to each image point in the image storage. The transfer storage, through which successive summations of lines make up each line of the sum image, has a capacity for line accumulation that is less than that of the corresponding transfer storage for image accumulation, and the values to be added are much closer together in time. It is preferable, under these conditions, to perform a summation, pure and simple, by means of a cycler comprising an adder and a line storage. As soon as a line is complete in the line storage, that is, after n summations of successive lines, the line is transferred to the image storage in place of a line of the same rank obtained during the preceding raster scan.

In accordance with the line accumulation system of the present invention, the image storage can be comprised of a single raster storage, or of two separate raster storages which comprise an even raster storage and an odd raster storage. The system in both cases is designed so it can be adapted to the standards of television receivers in which two interlaced rasters on the screen are read one after the other. In the first case the same single raster storage is read successively in a manner such as to make up the two interlaced rasters, which is represented by duplication of the lines on the screen. In the second case, the recorded inputs and the reading outputs of the two raster storages are controlled by the third portion of the sequencing means. Here, the n signals relative to each elementary field being added in two successive partial sums at the rate of n/2 signals for each partial sum, the results of the two partial sums provided at the output of the aforesaid line storage being put in storage, respectively, in the homologous cells of the even and odd raster storages, respectively. An input switch for the image storages is switched from one input to the other at a frequency of 2/nT1, and an output switch for these storages is switched at a raster frequency of Ft.

A second embodiment of the present invention utilizes an electronic processor made up of at least one adder, an image storage comprising a single raster storage, counting and sequencing means for addressing when recording and reading the image storage during a first, acquisition phase that evolves during one complete scan of the field of view by the aforesaid raster scanner, the counting means serving only for addressing when reading the image storage during a second, visualization phase is consecutive with the first phase wherein the image storage is read line by line at the line and raster frequencies of the aforesaid television monitor.

In accordance with this second embodiment, the image storage serves, in the first, acquisition phase as a transfer storage through which the successive summings of the lines are made. Accordingly, there is no permanent updating of the image, line by line, on the television monitor, as is possible in the first embodiment. After one complete scan by the raster scanner, the content of the image storage is fixed and can be transmitted by successive readings at the raster frequency to the television monitor where a fixed image thus appears on the screen.

BRIEF DESCRIPTION OF THE DRAWINGS

A more complete appreciation of the invention and many of the attendant advantages thereof will be readily apparent as the same becomes better understood by reference to the accompanying drawings wherein:

FIG. 1 is a block diagram of a first embodiment of the present invention;

FIG. 2 is a block diagram of an image storage that is suitable for the first embodiment of the present invention.

DETAILED DESCRIPTION OF PREFERRED EMBODIMENTS

Figure 3:
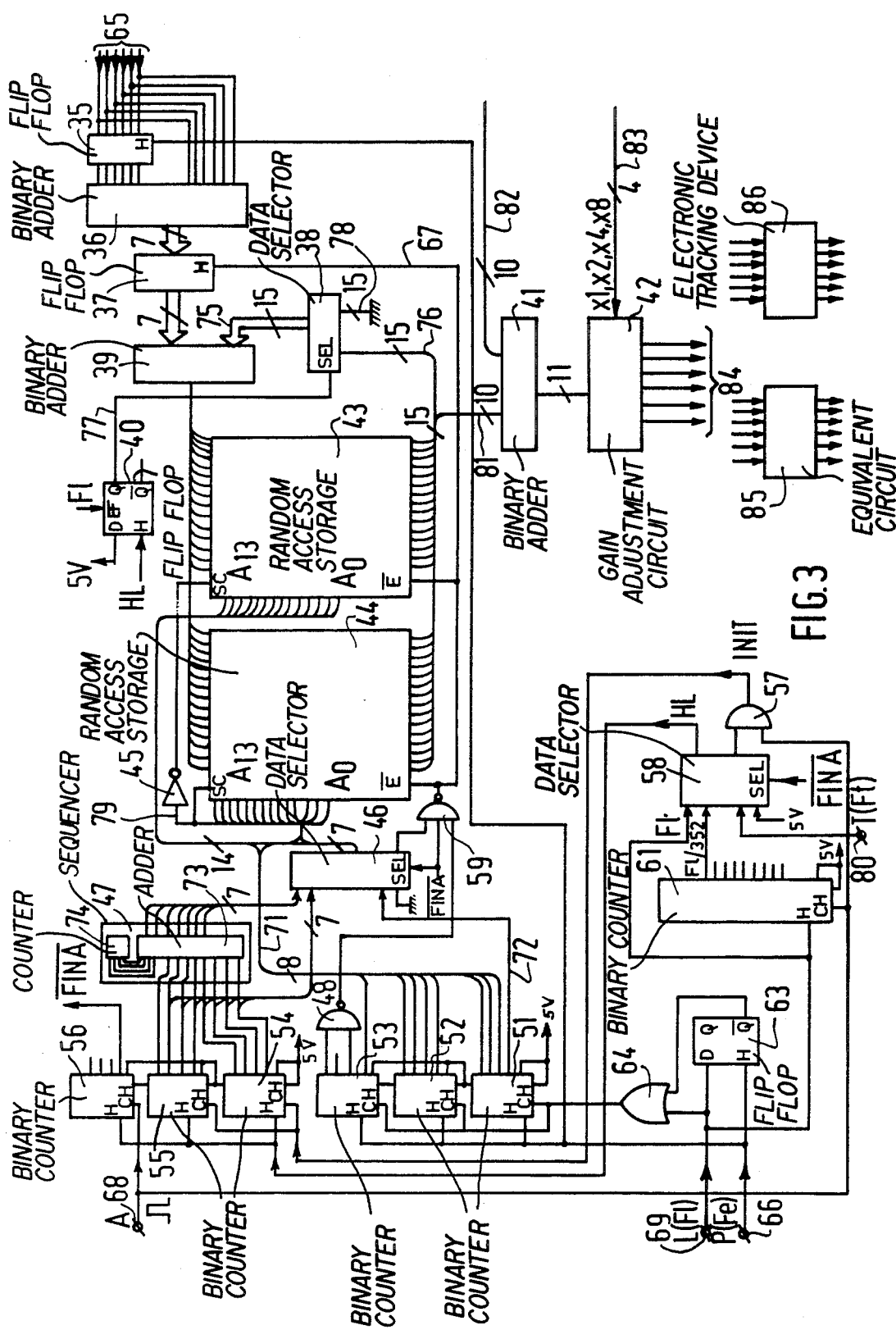
FIG. 3 is a block diagram of a portion of an electronic control module for a second embodiment of the present invention.

FIG. 1 shows a thermographic camera 1, electronic processor 2, and the means for visualization 3 on the screen of a television monitor 4. The purpose of camera 1 is to analyze radiation (preferably infrared), and comprises known optical/mechanical devices for raster and line scanning (not shown). These optical/mechanical devices focus the infrared radiation received on a detection matrix in the camera comprising at least one photosensitive detector, the dimensions of which are approximately those of an element in the field of view, the real instantaneous image of the field of view on the plane of the detectors being made up of juxtaposed elements. An electrical signal is emitted by each detector, at the rate of one signal for the passage of an element of the image before each detector, and is transmitted to electronic processor 2.

Initially, it will be assumed that the camera is made up of only one photosensitive detector (infrared detector). The output signal from the detector is transmitted in series to electronic processor 2 over conductor 5 with the image of the field of view being projected on the plane of the detector line by line such that the successive lines of the image are adjacent. Electronic processor 2 comprises in known fashion, digitizer 6 which converts the series analog signal received from camera 1 into a series digital signal, for example 6 bits over multiple conductor 7, which represents 64 possible different levels of contrast. It will be noted that to avoid a multiplicity of lines, the multiple conductors are shown in the drawings by a single line cut by an oblique line with the number of conductors adjacent thereto.

The 6 bit digital signal is transmitted in known fashion for the customary operation of an infrared thermography system to digital processor 8 in which different types of filtering or processing can be performed, such as concatenation, convolution, or elimination of the landscape background, for example. After this the digital signal is transmitted in 6 bits over conductor 9 to digital-to-analog converter 11, which transmits a series analog signal at a standard rate over conductor 12 to visualization device 3. In a simplified version of the infrared thermography system two successive raster scans in the camera and on the television monitor screen can be identical, that is, a line of given rank of a scan corresponds to a line of the same rank of a following (or a preceding) scan.

In practice and what is discussed in the text that follows is a slightly more complex version in which there are interlaced even and odd lines, that is, two successive rasters on the television monitor screen are spatially displaced from each other by the height of a raster half-line, the total image of 510 lines, for example, being made up of two successive rasters of 255 lines each, one group known as the even raster comprising even lines, the other group known as the odd raster, comprising odd lines, and itself being followed by an even raster. This interlacing in the case of the normal synchronized operation of camera 1 also results in a displacement of one-half a line between two successive raster scans, and on the detection matrix, being given that the lines have a height based on the diameter of the detector, these lines being adjacent and contiguous during scanning, one is led to consider that any image line for a given scan of the field overlaps by one-half a line more and one-half a line less of the image for the preceding, or subsequent, scan, this point being explained here in detail for a better understanding of the invention described below.

The first requirement of the present invention is to slow down camera raster scan to a predetermined rate, represented preferably by an integer n. The result is that two successive lines of the image on the plane of the detector overlap almost completely instead of being adjacent and contiguous, and the more overlap, the higher the number n. It thus will be seen that there is little interest in selecting a number n less than 10. It follows that each line of the image can be reconstructed in the form of an electronic signal by summing image point by image point of n successive lines henceforth necessary to sweep the dimension of an element in the field, that is, to sweep the height of a detector in the raster or vertical direction of the image. It will be noted that for this operation complete synchronization between the operation of camera 1 and that of visualization means 3 no longer is indispensable since the storing of the data signal is required. It is, however, recommended that the same value of the line frequency within the camera be retained so as not to modify the characteristics of the known filtering system that is necessary for filtering the signal, the spectrum of which is linked with the particular line frequency in the camera.

The infrared thermography system in accordance with the present invention, in order to function in the line accumulation mode, comprises between digitizer 6 and digital-to-analog converter 11, a signal processing circuit disposed in place of or in parallel with digital processing unit 8. This circuit is made up of a series succession of a cycler comprising adder 13 with two inputs and one input, line storage 14, and image storage 15. In the preferred case, in which this control circuit co-exists with unit 8, as shown in FIG. 1, selection unit 16, placed just upstream of digital-to-analog converter 11, provides for selecting the desired digital processing for the series digital signal carried by conductor 7. When operation by line accumulation is selected by unit 16, control unit 17 provides a two-state control signal A, to camera 1, to operate in the slowed-down raster scan mode, and also to unit 16 to select at its inputs the outputs of the reader of image storage 15. Further, sequencing means 10 is interconnected with camera 1, visualization means 3, line storage 14, image storage 15, and adder 13. Adder 13 receives, point by point, at a first input 18 the same signal as that at the input to unit 8, picked off in parallel at the output of digitizer 6.

At the very beginning of operation, and for each point in the first image line, this signal is added to the value 0 present at second input 19 of adder 13 for each point in the line, and the result if placed in storage in line storage 14, which is, for example, of the FIFO type and has a capacity of at least one complete image line. When the first point in the following scan line, that is, the second line, presents itself in the form of 6 bits to first input 18 of the adder 13, the previously stored first point in the first line appears simultaneously at second input 19. The two points are added, and the result is placed in storage 14 after the last point in the first line. In this simple example of the operation, storage 14 thus operates as a simple shift register and operates at the point frequency, Fe, available at the output of unit 6. Storage is accomplished cyclically for a given line of an image to be reconstructed until such time as each point in the line considered has been added to itself n times. It will be noted in this regard that the number of bits in each storage cell in storage 14, as well as the number of conductors in parallel at the input and at the output of storage 14, must be increased with respect to the number of conductors at the first input to adder 13, so that the result of the final addition is not deprived of its most significant bits. One thus has obtained a complete line of the image to be reconstructed.

The first sequencing means (not shown) of a known type that responds to frequency F1, acts at the end of each time interval n/F1 to trigger the recording of the output from line storage 14 in image storage 15. This serial transfer over conductor 21, carrying approximately the same information as input 19 of a reconstructed image line of a given rank from line storage 14 to image storage 15 to a cell of the same rank, is accompanied by the simultaneous erasure of the line that had previously occupied this cell in storage 15. Simultaneously, the sequencing means inhibits the second input to the adder 13, which transfers the corresponding points of the first scan for the second line of the image to be reconstructed to storage 14. Operation continues in this fashion, cyclically, at frequency F1/n until such time as image storage 15 is completely full. Two variations are possible at this stage of the operation.

The first possibility consists of conserving the content of storage 15 and repeatedly reading it to obtain a fixed image on the television monitor. In this case the operation described above corresponds to an acquisition phase lasting for a period of time equal to n/Ft, that is, for the time necessary for a slowed-down raster scan in the camera. It is possible to return to normal operation of the system by triggering signal A, or to operation in accordance with the invention by triggering signal A twice in succession so as to obtain a more recent fixed image of the field of view.

In accordance with the second possiblity, the recording and reading of storage 15 are uninterrupted, but it is necessary to see to it that the recording and the reading take place during different time intervals, something that complicates the structure of line storage 14, as well as that of the sequencing means. For this mode of implementation of the invention, it is anticipated, for example, that the capacity of line storage 14 is increased to at least the content of a supplementary line. When an image line to be reconstructed is complete and stored in storage 14, the sequencing means switch the input and the output of storage 14 that has returned to the beginning of the cycle to the second line of the storage, previously emptied of its content, and, simultaneously, the output of the first line is switched to a second output of storage 14 connected to conductor 22 of image storage 15. The reading of the line to be updated for recording in storage 15 thus can be done within the limits of a delay equal to n/F1 under the control of the sequencing means contained in the image storage 15 itself. Recording is inhibited in storage 15 for the time required to read the line to be updated. The result of this mode of operation is the appearance on television monitor screen 4 of an image that is continuously updated, line by line, in accordance with the same movement of the slowed raster scan as that of camera 1.

It will be noted, for the two possibilities of the mode of realization described above, that only the most significant bits are retained for putting the image points in the image storage, the least significant bits that are discarded can be considered as not significant, that is, carriers of noise rather than information. This is why multiple conductors 21 or 22 in FIG. 1 have 11, rather than 15 conductors, respectively. The possibility of noise elimination such as this is a good practical demonstration of the gain in sensitivity obtained by the introduction of the invention. A numerical example will lead to a better understanding of the theoretical gain in sensitivity obtained.

Let us suppose that in normal operation, without progressive lineal accumulation, Fe, the frequency of points, is 15 MHz, that line frequency F1 is 15625 Hz, and that raster frequency Ft, double the image frequency on the television monitor, is 50 Hz. In normal operation, taking into account line and raster return times, the image on the television monitor screen is composed of 510 useful lines (two rasters of 255 interlaced lines) of 780 useful points each. In accordance with the invention, upon selecting the number n equal to 512, the gain in sensitivity obtained is $$\sqrt{\frac{512}{2}} = 11.3$$

Accumulation time per line is equal to (512/15.625=21.8 ms.

This slow time compared to the eye's remanence time, which is 200 ms, and assures good sharpness for the points of each accumulated image.

The time needed for a raster scan made in camera 1 is 0.0328×255=8.4 s

This time is the accumulated image acquisition time with reference to the first embodiment and of the image updating time with reference to the second embodiment.

The above numerical example corresponds to that indicated in FIG. 1, that is, to the transition from 6 to 15 conductors for the line storage, then to 11 conductors for the image storage. In the first embodiment, the line storage comprises 780 storage cells of 15 bits each, and in the second embodiment a double capacity. The image storage capacity for the two variants is 255 times 780 storage cells of 11 bits each. It will be noted that if a time of 8.4 s separates the image high and low between the beginning and end of raster scan, distortion can appear for a moving target. This must not, however, be confused with a lack of image sharpness. On the other hand, the increase in sensitivity obtained is such that observation range can be increased several score kilometers and the apparent speed of a moving target with a given absolute speed is slower the more distant this moving target, due to the smaller angular movement in the field of view observed. In accordance with the invention, this angle of field can be reduced to just 2° in 8.4 s, that is, a displacement of 10% on the monitor screen between two successive accumulated images. This is perfectly acceptable and provides good intelligence on the movement of this point. If there is a moving target instead of a point, with the mean observed diameter of the target one-tenth the mean diameter of the television monitor screen, a given dimension of the moving target will be further distorted by a value equal to one one-hundredth of the screen diameter, which is negligible.

What has been considered up to this point is that image storage 15 is comprised of a single raster storage, and that a complete image on the television monitor screen is obtained from two successive interlaced readings of this mage storage. This leads to duplication of the lines on the screen, each even line carrying the same information as the odd line with which it is associated.

It is possible to avoid line duplication and at the same time retain the display of the image of interlaced even and odd raster, and thus to improve image resolution and sharpenss on the television monitor screen by modifying the design of the raster storage and by so doing expand the sequencing means as shown in FIG. 2, which is a variant of the first embodiment of the invention.

Image storage 25 in FIG. 2 is made up of two separate storages, even raster storage 26, and odd raster storage 27. The multiple input to each raster storage can be connected to multiple conductor 29 by a contact in switch 28, there being more conductors than inputs to each raster storage, this conductor a homologue of conductor 21 or conductor 22 in FIG. 1. The multiple outputs of storages 26 and 27, with the same number of conductors, are connected by a contact in switch 31 to multiple conductor 32, which is connected to the inputs of digital-to-analog converter 11 (see FIG. 1). Half the lines are accumulated in line storage 14 to provide a reconstructed image line, that is, each image line is obtained by summing n/2 scan lines in time n/2F1, and the output or reconstructed lines at the output of storage 14 is doubled, that is, equal to 2F1/n. The capacity of line storage 14 thus can be reduced with respect to that shown in FIG. 1, or, in order to once again use the digital example in FIG. 1, the number of input and output conductors, and the number of bits for each storage cell, is 14, the number of storage cells in line storage 14 remaining unchanged. So far as storage 15 in FIG. 1 is concerned, storage 25 comprises twice as many storage cells, each storage cell with one less bit, that is, 10 bits instead of 11, for example. Thanks to the supplementary sequencing means, the position of contact 28 is reversed at frequency 2F1/n, the reversal taking place each time during the time it takes to sum a given line 14 and outside the time intervals during which recording in the image storage, in 26, or 27, takes place. There is no change in the manner in which recording in the image storage takes place here or in the first possibility. The contact in switch 31 is switched at frequency Ft in synchronism with electronic scanning of the television monitor to read storage 25.

A line frequency of 15625 Hz and a single infrared detector imposes a very high operating speed on the line scanner and brings with it the synchronization problems that the speed implies, as well as the need for a very fast and very sensitive photodetector. The practical preferance in order to avoid these technological constraints is to analyze several field of view lines simultaneously, 11 lines for example. If m equals the number of detectors in the vertical or raster direction in the detection matrix (m=11) it is possible to divide the speed of the line scanner by 11 with the raster scanning motion remaining unchanged. In this case, the signal will appear on several conductors (11 conductors) at the output from camera 1. The signal is coded in known fashion, placed in storage, then reread sequentially to obtain a series form in the electronic processor. Conductor 5 thus is a multiple conductor with 11 conductors, and it will be assumed, so as not to clutter the drawings, that the processing indicated in the previous sentence is by digitizer 6 as in FIG. 1. Given the scanning mode described above, which corresponds to normal operation, the succession of points in a line, each of which represents an element of the field of view, and the succession of lines from the digitizer output and made up in series, is, from the point of view of sequencing, identical with that obtained for the operation first described. In order to fix the concepts, that the succession of any 11 successive lines of the image occurs in both cases in 704 µs at the rate of 64 µs per line, this latter period always being taken as the line period (1/F1 in the following example). There is a small difference that appears when the image is displaced during normal operation, one that appears in the form of flaws in homogeneity between lines in the case of scanning with 11 detectors in parallel, these flaws being of two orders: first, the appearance of a linage effect involving all 22 lines, or all 11 raster lines, due to imperfect synchronization at the time of raster and line scans, and which corresponds to a slight overlapping, or, on the other hand, to a slight disjunction of two groups of 11 successive lines; second, the appearance of another linage effect within a group of 22, or of 11, lines, respectively, due to the fact that the different detectors are never exactly identical and thus generate signals that are too strong, or too weak, with respect to a predetermined type of signal.

If raster scan in the camera is slowed down during simultaneous analysis of several lines of the field of view, there no longer will be a series of lines at the output from digitizer 6 that corresponds to a regular advance in the raster direction, for example, from top to bottom of the image, as is the case in everything that has been described above the concerns known normal operation, or operation in accordance with the invention, but instead there will be partial overlaps between groups of 11 lines. It is assumed, for purposes of discussion, that in the first place the ratio by which raster scan is slowed is n=11. Given these hypothesis, it is seen that the image to be reconstructed progresses one line for each scan of 11 simultaneous lines, and that each line of the image to be reconstructed must be the result of the sum of 11 successive lines at frequency F1/11 while progressing from 1 to each 11/F1 period. This is also the period for obtaining the reconstructed lines, the order number of the output signal from the group of 11 detectors, and the period of a signal reconstructed in the form of a digital series at the output of device 6. The result thus obtained is that each of the 11 detectors contributes with the same weight to the determination of each point of the image to be reconstructed, and which guarantees at the end of processing perfect homogeneity of the image on the television monitor screen, even with detectors that present a definite sensitivity dispersion. This does not prejudice the system sensitivity gain, which is obtained as the result of accumulation by summing n (or n/2, respectively) lines. Line storage 14, in FIG. 1, must have a capacity at least that of the lines for the detectors in the raster direction in order to obtain this very advantageous mode of operation, 11 lines in this case in the possiblity of a preliminary acquisition mode for filling the image storage, and the same increased capacity of one line, or 12 lines, with the possibility of permanent progressive cyclical updating of the image.

As for the modes of the invention described above, summing takes place in adder 13 at the rate of F1/n and the results obtained at the output are transmitted cyclically to each of the 11 storage lines by the sequencing means (signal S is provided by device 10, in FIG. 1). The sequencing means also switch conductor 21, or 22, respectively, to the output of the complete storage line at each period n/F1, at this instant, in line storage 14, the content of this line being transmitted to image storage 15 prior to the end of the following n/F1 period and this storage line being simultaneously returned to zero. In view of the above disclosure, the necessary synchronization of devices 6, 13, 14 and 15 at the digital level indicated above will be obvious to one of ordinary skill in the use of integrated circuits.

It will be noted that operation in the modes of the invention described in the preceding paragraph could be simplified so as to keep the output signal provided in parallel analog form leaving camera 1 in parallel digital form in electronic processor 2. It nevertheless always is of interest to keep a digital output in series form for a signal from the camera for normal operation of the system. On the other hand, the choice of the value 11 for the number n is designed to provide a clear explanation of the mode of realization in question. This low value leads to a system sensitivity gain of only 1.65, which generally is insufficient for the applications envisaged and preferably a number greater than the number of detectors in the raster direction, m, will be selected. The number n is, preferably, a multiple r of m, which simplifies the organization of line storage 14 and its control by sequencing means 10, the recording in and reading of storage 14 thus being combined between those of the miscellaneous modes of the invention described above. For example $$n = 32 \times 11 = 352$$

is selected, each of the 11 detectors contributing the information needed for a reconstructed image line at the rate of 32 successive line scans (r=32), $$\sqrt{\frac{352}{2}} = 9.4$$

and to a line accumulation time of $$352 \times 0.064 \times 11 = 247.5 \text{ ms},$$

this time also being that needed for the accumulation of 11 consecutive lines. The image thus can be updated at the end of a time interval equal to that of raster scanning in the camera, or $$(0.2475 \times 255)/11 = 5.74 \text{ s}.$$

In accordance with another embodiment of the invention described below with reference to FIG. 3, line storage 14 in FIG. 1 is deleted so as to use only one storage which, in accordance with the addressing means here adapted, serves successively as line storage and image storage. This storage can be comprised of two raster storages, even and odd, respectively. However, only the raster storage will be described below. What is involved is a duplication of lines on the television monitor screen. One of ordinary skill in the scanning art knows how to adapt the embodiment of FIG. 3 to the use of two raster storages, even and odd. The major concern in the elaboration of the FIG. 3 embodiment which is more detailed than the preceding ones is to economize on storage capacity as much as possible, which explains certain special features of the scheme not yet set forth since they are all compatible with the previously discussed embodiments. The double use of the storage restricts the FIG. 3 embodiment to the possibility with preliminary phase acquisition. FIG. 3 shows only the part of the electronic processor of concern to the invention proper, that is, an analog signal processing circuit, that is connected between devices 6 and 11 in FIG. 1. Analysis in the camera is assumed made by 11 simultaneous lines of the detection matrix, and the input signal is supplied in series digital form to the input of the first control circuit. The same values as those in the last example given above have been selected for the description that follows, that is $$n = 32 \times 11 = 252.$$

Identification of the different circuits in FIG. 3 is as follows, reading from right to left, and from top to bottom:

35: flip-flop D with a three state output
36: binary adder
37: flip-flop D with a three state output
38: data selector, two lines/one line, noninverter (multiplexer)
39: binary adder
40: flip-flop D triggered by ascending clock edge
41: binary adder
42: gain adjustment circuit
43, 44: random access storages
45: inverter circuit
46: data selector, two lines/one line, noninverter (multiplexer)
47: sequencer comprised of an adder and an 11 counter
48: NAND gate
51, 52, 53 and 54, 55, 56: 4 bits synchronous binary counters
57: AND gate
58: data selector, two lines/one line, noninverter (multiplexer)
59: NAND gate
61: 4 bits synchronous binary counters
63: flip=flop D triggered by the ascending clock edge
64: OR gate The different components listed above, other than storages 43 and 44, are manufactured by Societe Signets, for example, of which Societe R.T.C., La Radiotechnique Compelec, 130 avenue Ledru Rollin, F-75540 Paris 11, is the French affiliate or by Texas Instrument in U.S.A. Commercial references to the integrated circuits can be the following:

flip-flops 35 and 37: 74 LS 374
adder 36: two 74 LS 283 circuits
selector 38: four 74 LS 157 circuits
adder 39: four 74 LS 283 circuits
adder 41: three 74 LS 283 circuits
storages 43 and 44: circuit 2167 (15 blocks, 16 kbits each) by INTEL
selector 46: 74 LS 157
sequencer 47: 74 LS 283 and an LS 163 fixed counter for cyclical 11 counting
counters 51 through 56: 74 LS 163
selector 58: 74 LS 157
counter 61: three 74 LS 163 fixed circuits for cyclical 352 counting
flip-flops 40, 63: 74 LS 74

Data from the digitizer 6 in FIG. 1, is supplied to input 65 of the circuit in FIG. 3 in the form of 6 bits in parallel by 6 conductors for each instantaneous analysis point of the image. The information is transmitted through flip-flop 35, which delays this information for one clock period, to adder 36 which receives the same information in parallel, directly, at a second multiple input. The sum appears at the output of adder 36, and can be looked upon as the mean of the information relative to two successive points at input 65. The clock period for flip-flop 35 is the same as that for the arrival of the points at input 65, and corresponds to frequency Fe of 15 MHz, which is that of signal P at input 66. Each mean value is transmitted to flip-flop 37, which has the dual function of resynchronizing the data signal it receives and to transmit to adder 39 only one of the two input valves it receive successively by means of a clock signal over one conductor 67 at one-half the speed of flip-flop 35. Thus, the purpose of the input stage of circuits 35, 36 and 37 is to transform the information relative to two successive points into summed (or mean) information about these two points, the result of which is to half, approximately, the capacity of storages 43 and 44 and to permit the use of slower, and thus cheaper, circuits downstream from flip-flop 37.

Once storage 43 and 44 are full, filling accomplished during the acquisition mode, these storages are read at a rate such that each storage point is read twice succession, that is, a duplication of points appears on the television screen, just as there is a duplication of lines as already described above. Each pair of identical points represents the means value of two successive points of the reconstructed image obtained in the modes of realization relative to FIGS. 1 and 2. The image on the television monitor is made up at the elementary level of quadruplets of identical points, not to be confused with the effect due to an electron lens, this latter providing magnification of the image as described below. In this case the effect obtained corresponds to a loss of definition of the image due to a reduction by three-quarters of the rated capacity of the image storage.

Pulse signal A at input 68 triggers the operating process, which begins with the image acquisition phase and during which image storage 43, 44, is used at the same time as the line storage. Sequencing of the calculation (addition) cycle of storage 43, 44 and adder 39 is by addressing, recording, and reading by counters 51, 52 and 53, for addressing points, and counters 54, 55 and 56 plus sequencer 47 for addressing lines. For this purpose, first of all, counters 51, 52 and 53 receive signal P at frequency Fe 15 MHz at their clock input, and signal L at frequency F1 15625 Hz (T1 period 64 $\mu$s) at their loading input CH, input 69, this signal being synchronized with the clock signal of the points through flip-flop D 63 and OR gate 64, connected in known fashion as indicated in FIG. 3. The function of input CH is to again limit the number of points to be counted per image line and to reduce that number to 256, for example, which, given the duplication of points, results in a line reduced to two-thirds of its maximum length on the screen of the television monitor. This is accomplished by prewired internal connections in counters 51, 52 and 53. The bits for the address count of points at the output of counters 51 to 53 are 8 in number on multiple conductor 71, counted from the second to the ninth rank, in a manner such that the elementary significant bit for addressing has an inversion frequency equal to Fe/2, which corresponds to taking into consideration only one of two points. The bit of rank one on conductor 72 at the output is used for recording/reading control E of storage 43, 44 and to generate the flip-flop D 37 clock signal. To this end, conductor 72 is connected to one input of selector 46, which is selected during the acquisition mode (signal FIN A at state 1). The signal on conductor 72 then is transmitted to conductor 67 by NAND gate 59, which functions as an inverter, during the acquisition mode, because its other two inputs are at state 1. It will be noted that inputs E of the storages are activated by writing when they are in the logic state 0, which indicates the selected notation E in place of E, which would correspond to the inverse of recording, i.e. reading. The same notation has been selected for the FIN A signal. Two of the three highest ranking bits at the output of counter 53 are used at a logic level to mark the beginning and end of point counting during each line period. The state 1 or 0 of these two bits depends on counting and on the influence due to the activation of the CH input of the counter. Insertion in the storage is permitted during a time interval in each period T1 equal to 512 Te, Te being the period of appearance of the points, an interval during which at least one of the two bits is at the 0 state, the two bits being at state 1 outside this time interval. For this, the two bits in question are transmittee via NAND gate 48 to another input of NAND gate 59.

Line counters 54, 55 and 56 receive signal HL, deduced from signal L after processing by circuits 61 and 58, at their clock input. Signal FIN A is at state 1 during the acquisition phase, and is the output signal at frequency F1/352 from counter 61, which was selected by circuit 58 as distinguished from signal HL. Counter 61 receives signal L at its clock input and is programmed to emit a pulse every 352 T1. In a manner analogous to that described above for the point counters, properly so-called line counters 54 and 55 are initialized at their CH input by an INIT signal which, insofar as the acquisition phase is concerned, is identified as signal A transmitted via AND gate 57, the other selected input for circuit 58 of which is at state 1. As for the line points, the CH inputs of counters 54 and 55, when activated, center a reduced number of lines, in this case 128, or one-half a raster, inside the raster analyzed. To this end, the eight output conductors of counters 54 and 55 are connected to adder 73 internal to sequencer 47. The transition from state 1 to state 0 of the least significant bit at the output of counter 56 after a complete cycle of counting by counters 54 and 55, marks the end of the acquisition phase (transition from FIN A to active state 0). The 4 outputs of 11 counter 74 internal to the sequencer also are connected to four adder 73 inputs. Counter 74 receives signal L at its clock input in a manner that is not shown, with the result that the configuration of bits for addressing the lines at the output of adder 73 is increased by one each period T1 per cycle of 11 consecutive units with return in accordance with periodicity 11 T1 for the configuration of bits at the output of counters 54 and 55.

The configuration of bits cited last of all is increased by one each time 32 consecutive cycles occuring counter 74. The interlacing of lines identical with that which exists at input 65 as a result of internal scanning by the camera selected for the development of the invention is made to correspond to the reading of the storage. This makes it possible to cause each line at input 65 to coincide with the corresponding line in storage 43, 44, representative of the same part of the field of view analyzed at two multiple inputs of adder 39. Each line is complete after 32 successive summings at the rate of 11 F1 in the manner indicated above and is retained as in storage 43, 44 for the image storage line. It is necessary to ensure that the information at the second input 75 of adder 39 is null for each new storage line during the acquisition phase. To this end, the data coming from storage over conductor 76 are transmitted to input 75 via selector 38, the selection input of which receives a logical signal from flip-flop D 40 over conductor 77. A logic circuit, realized with the aid of flip-flop D 40, puts a one on the rising edge of HL and a zero on the falling edge of F1, and provides conductor 77 with a logic level. At the beginning of each period of signal HL, and during a period of time equal to one-half a period for signal F1, the signals on 15-conductor multiple conductor 78, connected to ground, are selected, and outside of these time intervals the signals on conductor 76 are selected. Storage is represented in two parts for technological reasons, two integrated circuit pieces being necessary to obtain the desired storage capacity: 128×256×15 bits. When half the number of possible addresses is reached, conductor 79, which is the highest rank for addressing storage 44, changes logic state. The effect is to invert the logical states at the circuit selection inputs of storages 43 and 44 by inverter circuit 45, i.e. inhibit storage 43 while at the same time activating storage 44. After all lines have been entered in the image storage, signal FN A becomes active, changing from logical state 1 to logical state 0, and marking the end of the acquisition phase and the beginning of the reading on the television monitor.

The FIN A signal acts on the circuit in FIG. 3 in several ways during its transition to 0. The presence of a logic zero at the input to the AND gate 59 circuit produces a level 1 at the output. This positions storages 43 and 44 for permanent reading. The change in logic state at the selection input to selector 46 results in the first 7 conductors at the output of counters 54 and 55 being selected for line addressing of the storage instead of the 7 conductors at the output from sequencer 47. Simultaneously, through selector 58, clock signal HL, for line addressing, changes from frequency F1/352 to frequency F1, whereas the INIT signal is identified with signal T at raster frequency Ft present at input 80. Signal Ft is transmitted to the loading inputs of counters 54 and 55 and acts from that time on to center successive rasters on the television monitor screen in the same way as signal L acts to center the line.

Only the 10 most significant bits of the 15 bits in each storage cell are retained for permanent reading of the storage, symbolized by multiple conductor 81 in FIG. 3, and similar to that described above with reference to FIG. 1. The dropping of 5 insignificant bits is justified as follows. Noise is added 352 times. Its effective value increases in the ratio of $\sqrt{352}=18.76$ if this noise is assumed to be Gaussian. It thus has an effective value of about 32 levels, or 5 bits. Thus, 10 significant bits remain in the 15 bits obtained. Actually, a television monitor cannot visualize more than 64 levels, or 6 bits, maximum. The dynamics of the information received thus is much superior to that which the monitor is capable of visualizing. It is necessary to anticipate a function permitting the visualization of the image in the dynamic zones the user wants to select. Image accumulation (updating) time can be thought to run too long for certain applications to select an n value clearly less than that selected for the embodiment of FIG. 3. For example, the choice of n=55 (m=11, r=5) is a good compromise between a gain in sensitivity of 3.7 associated with contrast possibilities and an image updating time of 0.9 s.

Conductor 81 can be connected directly to a digital-to-analog converter (block in FIG. 1) for display on the television minitor. It is, however, interesting to be able to exploit the excess of significant bit at the output of the image storage and, in a further embodiment, automatic or interactive dynamics regulation (threshold-brightness and gain-contrast) is anticipated so as to enable the operator to see the information of interest to him among the (10) significant bits. Interactive regulation can be controlled by the brightness and contrast knobs, the former having the effect of adding a constant that depends on the position of the brightness knob, and the latter having the effect of multiplying the result by 1, 2, 4, or 8. Adder 41 in FIG. 3 regulates brightness. The adder receives the 10 bits over conductor 81 at a first input, and 10 bits over multiple conductor 82 at a second input controlled in known fashion, but not shown, by the brightness knob. The 11 conductors at the output of adder 41 are connected to gain regulation circuit 42 controlled by the contrast knob, not shown, by 4-wire multiple conductor 83. Circuit 42 can be a multiplier manufactured by TRW, the United States of America company (commercial reference MPY 12 AJ), or it can be made up of, for example, an analog data selector or selectors 38, 46, or 58, interconnected with an overflow logic circuit comprised of AND and OR gates. What is obtained at output 84 of circuit 42 thus is a series signal composed of 6 bits in parallel, suitable for display by visualization means 3 (FIG. 1) after digital-to-analog conversion.

It has been seen for the embodiments of the invention described above that the limitation imposed on the image storage capacity, often necessary because of the cost of the device, entails a reduction in the size of the image on the television monitor screen. This reduction, for example, one-half in the raster direction in the FIG. 3 embodiment, can be used to advantage by limiting the amplitude of raster scan in the camera, something that can be done simply in parallel with the reduction in the scanning rate. There thus is a gain in image acquisition (updating) time, which is reduced in the same proportion, with no change in the performance of the device, 2.87 s for n=352 in the example of FIG. 3, or 0.45 s for n=55 with the same storage capacity.

It is also possible to realize a 2X or 4X digital electron lens for the stored image in known fashion that is compatible with the reduction in the amplitude of raster scan. The effect of the 2X electron lens is an apparent enlargement of the image on the monitor screen, obtained at the reading level exclusively by the duplication of each line point and of each image line, or an increase in the image area on the screen by a factor of 4. This can be realized, for example, by the insertion of an equivalent circuit 85 in FIG. 3, with necessary synchronizations and sequences, between output 84 and the digital-to-analog converter 11 in FIG. 1). Simultaneous duplication of points in the horizontal and vertical directions is preferably accompanied by spatial filtering, which can be accomplished at the digital, or the analog, level by a reduction of one-half (or of one-fourth in the case of the 4X lens, respectively) in data signal bandpass, retaining only the low frequencies. In another connection, the infrared thermography system in accordance with the invention is suitable in particular for observing moving targets. One can add to the output 84 with advantage for this purpose an electronic tracking device 86 in FIG. 3, the effect of which is to correct distortion in the image of the moving target. This tracking effect can be obtained in known fashion by line-by-line correlation of the image to be visualized.

In view of the above disclosure, many modifications and variations of the system will be readily apparent to one of ordinary skill in the art. The system is not limited to maritime surveillance with a stabilized platform. It can also have land application for the detection of distant targets. This sytem also is usable to examine the deformation of materials by thermal topography of these latter. Therefore, the present invention is not limited by the above disclosure and is limited only by the scope of the appended claims.

The embodiments of the invention in which an extensive property or privilege is claimed are defined as follows:

What is claimed is:

1. A line accumulation infrared thermography system comprising:
    camera means for analyzing an image of a field of view, said camera means including a line scanner and a raster scanner for the sequential projection of a plurality of line elements from said field of view on a detection matrix comprising m thermosensitive detectors and providing an analog output, said raster scanner including an adjustable scan rate;
    means, responsive to sequential analog signals, for visualization of said image; and
    electronic processor means, responsive to said camera means analog output, for providing sequential analog signals to said visualization means, said electronic processor means comprising:
    (a) an analog-to-digital converter means, responsive to said camera means analog output, for providing serial output digital signals indicative of the element of said image projected upon said m thermosensitive detectors;
    (b) control means for adjusting said raster scan rate such that each of said lines of elements in said image is projected on said m detector n successive times before a subsequent line is projected where n is an integer not less than m;
    (c) adder means, responsive to said digital signals, for providing a sum of n successive signals and for providing an output representative of said sum of n successive signals for each of said elements;
    (c') line storing means, including m+1 line storage means, for storing said adder means output representative of said sum for each of said elements and for providing an output;
    (d) image storing means for storing said line storing means output representative of said sum for each of said elements;
    (e) sequencing means for repetitively reading said line storing means outputs stored in said image storing means; and
    (f) digital-to-analog converter means, responsive to said outputs read by said sequencing means, for providing sequential analog signals to said visualization means.

2. The infrared thermography system according to claim 1, wherein said image storing means includes a raster storage and said sequencing means includes means for parallel reading of said raster storage.

3. The infrared thermography system according to claim 1, wherein said visualization means comprises a television monitor having interlaced line scans, one plurality of interlaced line scans comprising an even raster and another plurality of interlaced line scans comprising an odd raster, said image storing means comprising an even raster storage and an odd raster storage, each of said raster storages having record inputs and read outputs responsive to said sequencing means, said n signal for each of said elements being added in two successive sums at the rate of n/2 signals for each sum, one of said sums being stored in an appropriate cell of said even raster storage and the other of said sums being stored in a corresponding cell of said odd raster storage.

4. The infrared thermography system according to claim 1, wherein said camera means detection matrix comprises m detectors arranged in the raster direction, where m is an integer, wherein said adder means includes m line storage means, each of said line storage means comprising means for storing the scan of n successive signals for each element in a line and for storing the sums for all elements contained in a line, said sequencing means further including means for sequentially reading said m line storage means.

5. The infrared thermography system according to claim 1, wherein said visualization means comprises a television monitor and said sequential analog signals are provided at the line and raster frequency of the television monitor and said sequencing means operates in acquisition and visualization phases, in said acquisition phase, said sequencing means enables said image storing means permitting the sum of n successive signals to be stored for each element of each line during a first scan of said field of view by said raster scanner, and in said visualization phase, said sequencing means reads the sum stored for each element in said image storing means at said line and raster frequencies.

6. The infrared thermography system according to claim 5, wherein said electronic processor means analog-to-digital converter includes means for preliminarily summing pairs of adjacent element signals and for transmitting one sum, representing a pair of adjacent element signals, to said adder means.

7. The infrared thermography system according to one of claims 1 through 6, wherein said electronic processor means comprises means, responsive to said image storing means, for regulating brightness and contrast of said image by means of adding a constant to the digital value in the case of brightness and by means of multiplying the digital value by a constant in the case of contrast, said regulating means providing an output to said digital-to-analog converter means.

8. The infrared thermography system according to one of claims 1 through 6, wherein said control means further includes means for reducing amplitude of said raster scan.

9. The infrared thermography system according to claim 1, wherein said sequencing means operates as an electronic lens and includes means for reading a reduced number of elements in selected adjacent lines and a reduced number of lines stored in said image storing means, said reading means reading each element in a line x times in succession and reading each line x times in succession in a scan to provide an image magnification on said visualization means, where x is equal to an integer.

10. The infrared thermography system according to claim 1, wherein said sequencing means includes means for compensating for distortion in the image of a moving target, said compensating means comprising a line-by-line correlation of said outputs stored in said image storing means.

11. A method of operating an infrared thermography system including a camera means for analyzing an image of a field of view, said camera means including a line scanner and a raster scanner for sequential projection of a plurality of line elements from said field of view on a detection matrix comprising M thermosensitive detectors and providing an analog output, said raster scanner including an adjustable scan rate; means, responsive to sequential analog signals, for visualization of said image; and electronic processor means, responsive to said camera means analog output, for providing sequential analog signals to said visualization means, said electronic processor means comprising: (a) an analog-to-digital converter means, responsive to said camera means analog output, for providing digital signals indicative of the element of said image projected upon said M thermosensitive detectors; (b) an image storing means for storing individual outputs corresponding to elements in said plurality of lines in said field of view; and (c) a digital-to-analog converter means, responsive to outputs stored in said image storing means for providing sequential analog signals to said visualization means, said method comprising the steps of:

reducing the raster scan rate such that each of said lines of elements in said image is projected on said M detectors n successive times before a subsequent line is projected, where n is an integer;

summing in an adder means, n successive signals and providing an output representative of a sum of n successive signals for each of said elements;

storing said sum outputs in a line store of an output;

and storing said line store output in said image storing means.

* * * * *

UNITED STATES PATENT AND TRADEMARK OFFICE
CERTIFICATE OF CORRECTION

PATENT NO. : 4,724,482

DATED : February 9, 1988

INVENTOR(S) : Jean-Louis DUVENT

It is certified that error appears in the above-identified patent and that said Letters Patent is hereby corrected as shown below:

Column 1, line 45: Change "$\sqrt{1}.$" to --$\sqrt{1}.$--;

Column 1, line 52: Change "tioning of $\sqrt{/2}$, is 2 even" to --tioning, is $\sqrt{1/2}$, that is 2;

Column 8, lines 16, 17: change "$\sqrt{\frac{512}{2}} = 11.3$" to -- $\sqrt{\frac{512}{2}} = 11.3$ --.

Column 8, line 20: change "(512/15.625=21.8" to --(512/15.625)=32.8 ms--.

Column 11, line 34: change "$\sqrt{\frac{352}{2}} = 9.4$" to -- $\sqrt{\frac{352}{2}} = 9.4$ --

Column 12, line 9: change "n=32x11=252" to --n=32x11=352--.

Column 13, line 67: change "FIN A" to --$\overline{\text{FIN A}}$--.

Column 14, lines 8, 23 and 43: change "FIN A" to --$\overline{\text{FIN A}}$--.

Column 15, lines 22 and 26: change "FIN A" to --$\overline{\text{FIN A}}$--.

Column 14, line 5: change "E" to --$\overline{E}$--.

Column 15, line 67: change "(block in FIG. 1)" to --(block 11 in FIG.1)--.

UNITED STATES PATENT AND TRADEMARK OFFICE
CERTIFICATE OF CORRECTION

PATENT NO. : 4,724,482

DATED : February 9, 1988

INVENTOR(S) : Jean-Louis DUVENT

It is certified that error appears in the above-identified patent and that said Letters Patent is hereby corrected as shown below:

Column 19, lines 4 and 15 change "M" to --m--.

Column 20, line 8, change "M" to --m--.

Signed and Sealed this

Seventh Day of February, 1989

Attest:

DONALD J. QUIGG

Attesting Officer

Commissioner of Patents and Trademarks